United States Patent Office 3,636,042
Patented Jan. 18, 1972

1

3,636,042
PROCESS FOR THE PREPARATION OF OXOPYR-
ROLES AND INTERMEDIATES USEFUL THEREIN
Irwin J. Pachter, Woodbury, and Karl Schoen, Kew
Gardens, N.Y., assignors to Endo Laboratories Inc.,
Garden City, N.Y.
No Drawing. Application Sept. 1, 1967, Ser. No. 664,942,
which is a continuation-in-part of applications Ser. No.
575,303, Aug. 26, 1966, and Ser. No. 599,387, Dec. 6,
1966. Divided and this application July 16, 1968, Ser.
No. 768,569
Int. Cl. C07d 27/26
U.S. Cl. 260—326.1
14 Claims

ABSTRACT OF THE DISCLOSURE

Process for preparing 2-aminoalkyl pyrrol-3-yl ketones and derivatives thereof, and novel compounds thus produced. The process is carried out by quaternizing 2-dimethylamino- or 2-piperidino-alkyl-pyrrol-3-yl ketones or derivatives thereof, including those having bi- and tricyclic nuclei, and reacting the quaternary salts either with a base and an amine, or, alternatively, with an amine only.

CROSS REFERENCE TO OTHER APPLICATIONS

This application is a division of application Ser. No. 664,942, filed Sept. 1, 1967 and now abandoned, which application was in turn a continuation in part of our copending applications Ser. No. 575,303, filed Aug. 26, 1966 and now abandoned, and Ser. No. 599,387, filed Dec. 6, 1966 and now abandoned. Certain of the compounds disclosed herein are described in our copending applications Ser. No. 403,387, filed Aug. 12, 1964 and now Pat. No. 3,410,857 issued Nov. 12, 1968, and Ser. No. 357,284, filed Apr. 3, 1964 and now abandoned.

BACKGROUND OF THE INVENTION (1) Field of the invention

This invention relates to a method of preparing compounds which are useful as tranquilizers, anti-dipressants and analgetics.

(2) Description of the prior art

Various compounds within the following class are known and have been described, for example, in our above-noted copending applications.

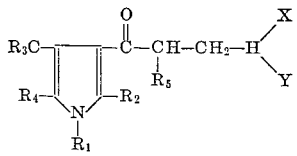

FORMULA A

In the above formula:

$R_1$ designates hydrogen a lower alkyl group having a maximum of 6 carbon atoms, phenyl, phenyl alkyl (where the alkyl group has up to 3 carbons), substituted phenyl or substituted phenyl-lower alkyl in which the substituent on the phenyl ring is halogen, lower alkyl, i.e., wherein the alkyl group has not more than 4 carbon atoms, lower alkoxy of not more than 4 carbon atoms, halogenated alkyl of not more than 4 carbon atoms, or 2-, 3- or 4-pyridyl;

$R_2$, $R_3$ and $R_4$ designate hydrogen alkyl, alkenyl or cycloalkyl having a maximum of 8 carbon atoms, phenyl, halo-penyl, (lower alkoxy)-penyl, thienyl, furyl, or benzyl;

$R_3$ and $R_4$ may be linked to constitute an alicyclic ring having a maximum of 8 carbon atoms;

2

$R_5$ designates hydrogen, alkyl, alkenyl or cycloalkyl, all having a maximum of 8 carbon atoms, phenyl or benzyl; and $R_2$ or $R_3$ may be linked with $R_5$ to constitute alicyclic rings having a maximum of 8 carbon atoms, those rings formed by linking $R_2$ and $R_5$ optionally being substituted by alkyl groups having 1–4 carbon atoms and those rings formed by linking $R_3$ and $R_5$ optionally being substituted by an alkyl or alkylidene group having 1–4 carbon atoms, a benzylidene or a benzyl group.

X and Y are each the same or different and are hydrogen, lower alkyl, lower alkynyl, lower alkenyl, cycloalkyl, bicycloalkyl, hydroxy-lower alkyl, alkoxy-lower alkyl, lower dialkylamino, lower acyloxyalkyl, carbamoyloxy-lower alkyl, phenyl-lower alkyl, heteroaromatic-lower alkyl, heteroaryl and saturated heteroaryl, and wherein X and Y may be linked, and when linked constitute a heterocyclic ring of not more than eight members.

Some of the compounds embraced within the scope of general Formula A, as set forth above, have heretofore been prepared, or may be prepared, through the Mannich reaction of the corresponding pyrrol-3-yl ketone with formaldehyde or a formaldehyde-yielding substance, e.g., paraformaldehyde, and a base X—NH—Y as set forth in the following reaction scheme:

REACTION SCHEME I

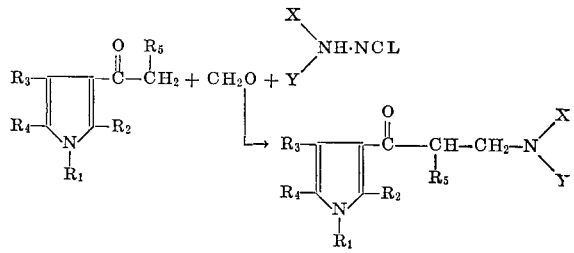

Resonance interaction of the electron-rich pyrrole ring with the ketone carbonyl in the pyrrole ketones renders these less reactive than structurally related aromatic ketones such as phenyl ketones and naphthyl ketones. One result of such lower reactivity is that the Mannich reactio proceeds very slowly with many of the important bases X—NH—Y or their corresponding salts. It has been found that side reactions occur during the prolonged reflux periods necessary for complete reaction; and frequently there are produced dark products which are difficult to purify.

Of the various Mannich reactions carried out, those with dimethylamine hydrochloride proceed most rapidly, with better yield and with higher purity. However, it has not been possible to produce primary or secondary amino alkyl ketones by the method of Reaction Scheme I, that is to say, compounds of general Formula A herein wherein the moieties X and Y may either or both be hydrogen.

Compounds where X and/or Y are lower alkynyl, lower alkenyl, cycloalkyl, alkoxy-lower alkyl, lower dialkylamino, heteroaromatic lower alkyl, heteroaryl and saturated heteroaryl have not been disclosed heretofore.

SUMMARY OF THE INVENTION

We have now discovered that it is advantageous in the preparation of pure products of Formula A in high yield to use as starting materials compounds of the following formula:

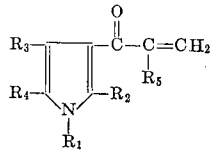

FORMULA B

Compounds of Formula B can be conveniently produced from quaternized salts of the dimethylamine Mannich bases of Formula A by splitting off therefrom, under alkaline conditions, the tertiary amine moiety.

Thus, it can be generalized that the dimethylamine Mannich bases can constitute the starting materials for the preparation of Mannich bases having a different amino function from that of starting compound A.

Illustrative of our new process is the sequence of steps just mentioned and set forth below:

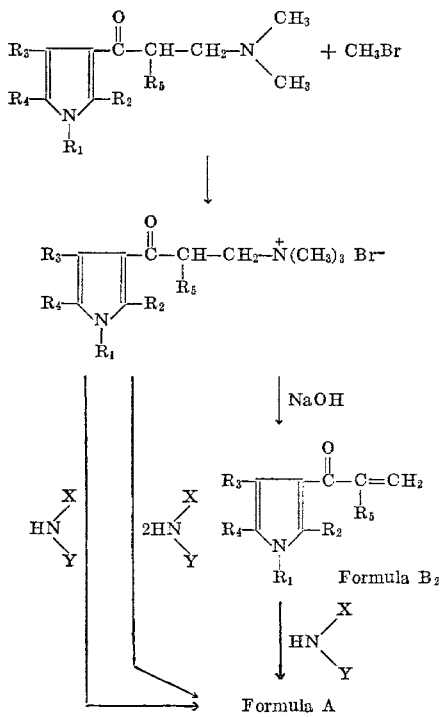

REACTION SCHEME II

The dimethylamine Mannich base is quaternized with an alkyl halide or sulfate, suitably a lower alkyl halide or sulfate such as methyl-, ethyl- or propyl-bromide, chloride, iodide, or sulfate, and the resulting quaternary salt is treated with aqueous alkali, suitably aqueous sodium or potassium hydroxide, to produce the stable methylene derivative.

Upon interaction of the methylene compound with a new base there is produced a final product of good quality and in high yield.

The success of the process of this invention is a consequence of the unusual stability of the methylene compounds of the Formula B (in which the symbols $R_1$ to $R_5$ have the same meaning as in Formula A). The compounds of Formula B are more resistant to polymer-forming side reactions than are structurally comparable aryl derivatives such as the acrylophenones.

The novel compounds which may be synthesized by the present process are those of Formula A wherein the moiety X and/or Y are hydrogen, which could not be satisfactorily prepared by the method of Reaction Scheme I. The present invention further provides compounds wherein X and/or Y are lower alkynyl, lower alkenyl, cycloalkyl, alkoxy-lower alkyl, lower dialkylamino, heteroaromatic-lower alkyl, heteroaryl and saturated heteroaryl.

Also prepared by the process of the present invention are novel compounds within the scope of general Formula A, more specifically exemplified by the following structural formulae:

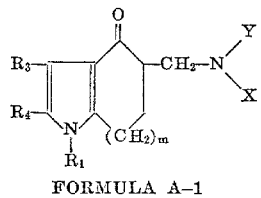

FORMULA A-1

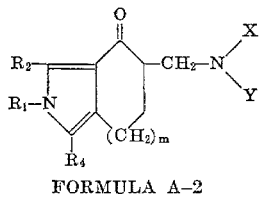

FORMULA A-2 wherein $n$ is 0, 1, 2, or 3, and $R_1$, $R_2$, $R_3$ and $R_4$, X and Y have the same values as in general Formula A.

Various of the novel oxopyrroles which may be prepared by the process hereof are disclosed and claimed in our copending applications Ser. Nos. 768,564 (EN–037); 768,565 (EN–035); and 768,567 (EN–038), each of which was filed on July 15, 1968. Various novel oxoindoles which may be similarly prepared are disclosed in our further copending application Ser. No. 768,566 (EN–034), also filed on July 15, 1968. Each of the above applications is a division of copending application Ser. No. 664,942, filed Sept. 1, 1967 and now abandoned, of which the present case is also a division.

The present invention provides a novel and convenient general method of synthesizing components containing a substituted 2-aminoalkylpyrrol-3-yl keto nucleus, i.e.

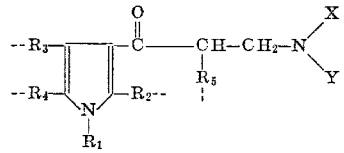

wherein $R_1$, $R_2$, $R_3$ and $R_4$, X and Y are as defined above. This basic moiety is also contained in the aminoalkyl-4-oxoindoles and isoindoles, as well as the aminoalkylcyclopentanopyrroles and aminoalkylcarbazoles, and the like, disclosed herein.

The compounds of the foregoing Formula A have central nervous system activity; and are particularly useful as tranquilizers, ataractics, and sedatives. They are also useful as analgetics and antidepressants.

The compounds can be put up in customry pharmaceutical composition forms such as tablets, capsules, syrups, suppositories etc., in accordance with the techniques of pharmaceutical compounding employing appropriate carrier or vehicular materials as excipients, etc.

The compounds may be administered at dosage levels of about 0.07–3 mg./kg., preferably between 0.7–1.8 mg./kg. daily. A compound prepared by the process of this invention showed marked antipsychotic activity in humans when administered at the preferred level—i.e., 50–125 mg. per patient daily. Chronic schizophrenic male patients showed improvement in disorientation, thinking and perceptual distortion as well as in schizophremic disorganization and social competence.

THE PREFERRED EMBODIMENTS

In the preferred embodiments of the present invention, in the Formula A, $R_1$ designates hydrogen, a lower alkyl group such as methyl, ethyl, propyl, butyl or hexyl; phenyl, phenyl lower alkyl such as benzyl, phenethyl, or phenylbutyl; substituted phenyl or substituted phenylalkyl, wherein the substituent on the phenyl ring is chloro, bromo, or fluoro, alkyl of not more than 4 carbon atoms, alkoxy, for example, methoxy, ethoxy, propoxy, or butoxy; haloalkyl of not more than 4 carbon atoms, for example, bromoethyl, dichloroethyl, dichloropropyl, fluorochlorobutyl, or bromobutyl; or 2-, 3- or 4-pyridiyl;

$R_2$, $R_3$ and $R_4$ designate alkyl suitably lower alkyl such as methyl, propyl, butyl or hexyl; alkenyl, preferably lower alkenyl such as propenyl, butenyl, pentenyl, hexadienyl, and heptadienyl; or cycloalkyl, for example, cyclopropyl, cyclopentyl, cyclohexyl, or cyclooctyl; phenyl; halophenyl such as bromophenyl, chlorophenyl or fluorophenyl; (lower alkoxy) phenyl suitably methoxy-, propoxy- or butoxyphenyl; thienyl; furyl; or benzyl;

$R_3$ and $R_4$ may be linked to form, for example, the 1,4,5,6 - tetrahydrocyclopenta [b] pyrrole, 4,5,6,7 - tetrahydroindole, 1,4,5,6,7,8-hexahydrocyclohepta [b] pyrrole, and the 1H-4,5,6,7,8,9-hexahydrocycloocta [b] pyrrole nuclei;

$R_5$ designates hydrogen, alkyl, preferably lower alkyl such as methyl, propyl, butyl, pentyl, and hexyl; alkenyl suitably lower alkenyl such as vinyl, propenyl, butenyl, and hexenyl; or cycloalkyl such as cyclopropyl, cyclopentyl, cyclohexyl, cycloheptyl, or cyclooctyl;

$R_2$ and $R_5$ may be linked to form, for example, the 1,4,5,6-tetrahydro-4-oxocyclopenta (b) pyrrole; 4,5,6,7-tetrahydro-4-oxoindole; 1,4,5,6,7,8-hexahydro-4-oxocyclohepta (b) pyrrole; 4,5,6,7,8,9-hexahydro 1-H-4-oxocyclo-octa (b) pyrrole nuclei;

Similarly, $R_3$ and $R_5$ may be linked to form analogous nuclei such as 2,4,5,6-tetrahydro-4-oxocyclopenta (c) pyrrole; 4,5,6,7-tetrahydro - 4 - oxoisoindole; 2,4,5,6,7,8-hexahydro - 4 - oxocyclohepta (c) pyrrole; 4,5,6,7,8,9-hexahydro-4-oxocycloocta (c) pyrrole;

X and Y are each the same or different and may be hydrogen; lower alkynyl, such as propynyl, butynyl, and pentynyl; lower-alkenyl, such as propenyl, butenyl, or hexenyl; lower alkyl such as methyl, ethyl, butyl, pentyl, hexyl, or heptyl; cycloalkyl, suitably cyclo-lower alkyl, such as cyclopropyl, cyclobutyl, cyclopentyl, cyclohexyl or cyclooctyl; hydroxy-lower alkyl, lower alkoxy lower alkyl, dialkylamino, suitably di (lower alkyl) amino such as dimethylamino or saturated heterocyclic bases such as piperidino; lower acyloxy-alkyl, suitably lower alkanoyloxy-lower alkyl; carbamoyloxy-lower alkyl; phenyl-lower alkyl; heterocyclo lower alkyl; and wherein X and Y may be mutually linked; and when linked constitute a heterocyclic ring of not more than 8 members, suitably a 5 to 8 membered ring, containing hetero atoms of the group oxygen, nitrogen and sulphur of which at least one member shall be nitrogen.

It should be understood that in the present disclosure unless otherwise specified, the partial designation "lower alk" shall signify an aliphatic residue of no more than 5 carbon atoms.

Examples of heterocyclic rings which X and Y may form are piperidino, (lower alkyl) piperidino, di(lower alkyl) piperidino, (lower alkoxy) piperidino, hydroxypiperidino, alkoxycarbonyl phenylpiperidino, phenylhydroxypiperidino, (lower alkanoyl) piperidino, pyrrolidinyl, (lower alkyl) pyrrolidino, (lower alkoxy) pyrrolidinyl, hydroxypyrrolidinyl, morpholino, (lower alkyl) morpholino, thiamorpholino, (lower alkyl) thiamorpholino, di - (lower alkyl) - thiamorpholino, (lower alkoxy) thiamorpholino, piperazino, (lower alkyl) piperazino, di-(lower alkyl) piperazino, (lower alkoxy) piperazino, phenylpiperazinyl, chlorophenyl-piperazinyl, tolylpiperazinyl (methoxyphenyl) piperazinyl, hydroxyalkyl-piperazinyl, lower alkanoyloxy-lower alkylpiperazinyl carbamoyloxy-lower alkyl piperazinyl, pyridyl, pyrimidinyl, pyridazinyl, pyrazolyl, quinolyl, isoquinolyl, pyrrolyl, thienyl, furyl or oxazolyl and azabicycloalkyl. The terms "lower alkyl" and "lower alkoxy" refer to both straight and branched chain radicals of no more than 5 carbon atoms.

The aforementioned heterocyclic moieties or unsaturated derivatives thereof may themselves be bonded to a lower alkyl group, or by a ring atom other than nitrogen to constitute a heterocyclo alkyl or heterocyclo moiety respectively designated by the symbol X or Y.

In the preferred modification of the process a dimethylamine Mannich base of general Formula A is utilized as the starting material for other Mannich bases of Formula A having a different amino function.

Although dimethylamine Mannich bases are most advantageous as starting materials for this process, other lower alkylamino Mannich bases as well as heterocyclic bases such as the piperidino Mannich base may also be used.

In the preferred procedure, the Mannich base, which is usually obtained in the form of an acid salt, suitably the hydrochloride, is treated with aqueous ammonia and the free Mannich base isolated from the aqueous mixture. In a suitable mode of isolation, the base is extracted from the reaction mixture with a low boiling, reaction inert, water-immiscible solvent, such as ethyl acetate, diethyl ether, or the like. Upon evaporation of the solvent, the base is taken up in a suitable organic solvent, preferably a non-hydroxylic, polar organic solvent such as acetone, and treated with the quaternizing agent. In the preferred modification, gaseous methyl bromide is used as the quaternizing agent, and is bubbled into the solution of the Mannich base until no further separation of the quaternary is noted. The quaternary salt is then isolated as a residue by filtration, and recrystallized, suitably from a lower alkanol such as methanol.

The quaternary salt has the general Formula C

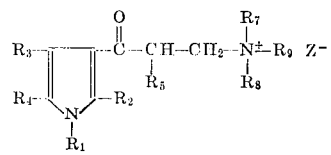

where $R_1$, $R_2$, $R_3$, $R_4$ and $R_5$ are as above. $R_9$, $R_7$ and $R_8$ are alkyl having from 1 to 8 carbon atoms; however, $R_9$ and $R_7$ may be joined to form a ring containing up to 7 carbon atoms, i.e., the piperidine, pyrrolidine and hexamethyleneimine nuclei; Z is an inorganic radical such as chloride, bromide, sulfate, or the like.

The quaternary salt of the Mannich base, for example, the methobromide, the methiodide, the methosulfate, or the like, is dissolved in water and treated with an excess of an alkali such as aqueous sodium hydroxide, ammonia, or a strong organic base such as triethylamine. The desired vinyl compound of general Formula B separates as a precipitate, and is isolated. The vinyl compound of general Formula B is then purified, preferably by recrystallization from the suitable solvents such as a lower alkanol, preferably ethanol.

The vinyl compounds of general Formula B are then reacted with amines of the general formula X—NH—Y, wherein X and Y have the significance set forth hereinabove, and may thus represent primary amines or secondary cyclic or acyclic amines.

The reaction of the amine with the compound of Formula B may be carried out in a number of modifications. The preferred mode will depend upon the reactivity and volatility of the respective reactants. Many primary and secondary amines will react with compounds of Formula B at ambient temperature, that is to say, from about 10° C. to about 30° C. with evolution of heat where the reaction is carried out in a solvent such as a lower alkanol, for example, methanol, ethanol, propanol, butanol, and the like, or in di-lower alkyl ketones, for example, acetone, methylethyl ketone, di-isopropyl ketone, and the like, as well as in lower alkyl lower alkanoates such as ethyl acetate, propyl acetate and butyl propionate.

Where desired, the reaction may be carried out in similar solvents under reflux at temperatures of from about 50° to about 150° C. Where it is desired to use low boiling solvents, particularly with volatile amines, the reaction may be advantageously carried out in pressure vessels at temperatures up to about 150° C. In yet another modification of the procedure, it is sometimes advantageous to use excess of the amine base itself as the solvent.

Reaction time varies from one minute to 24 hours, depending upon the nature of the reactants. Most reactions proceed to completion in less than 8 hours.

Among the amines which may be employed in the process of the present invention which may be primary or secondary, may be included those bearing alkyl groups, suitably lower-alkyl groups, such as methyl, ethyl, propyl, and butyl; cycloalkyl groups, such as cyclopropyl and cyclohexyl; alkenyl groups, suitably lower alkenyl groups, such as allyl, methallyl and hexenyl; alkynyl groups, suitably lower alkynyl groups, such as propynyl, butynyl, and hexynyl groups; or phenyl-alkyl groups, suitably phenyl-lower alkyl groups such as benzyl, phenethyl, and phenyl-butyl groups; alkoxy-alkyl groups, suitably lower alkoxy-lower alkyl groups, such as methoxyethyl, ethoxyethyl, butoxyethyl, pentoxypropyl; hydroxyalkyl groups, suitably hydroxy-lower alkyl groups, such as hydroxyethyl, hydroxpropyl, hydroxybutyl, or hydroxhexyl; dialkylamino, such as dimethylamino.

Also included within the scope of the amines used in this process are heterocyclic secondary amines, wherein the secondary amino function is part of the cyclic moiety which may, if desired, itself be substituted. Preferred among these compounds are five or six membered heterocyclic amines containing at least one nitrogen-atom in the ring, and from zero to two other heteroatoms of the group oxygen, nitrogen and sulfur such as piperidino, (lower alkyl) piperidino, de(lower alkyl) piperidino, (lower alkoxy) piperidino, hydroxypiperidino, alkoxycarbonylphenylpiperidino, phenylhydroxypiperidino, (lower alkanoyl piperidino, pyrrolidino, (lower alkyl) pyrrolidino, (lower alkoxy( pyrrolidino, hydroxypyrrolidinyl, morpholino, (lower alkyl) morpholino, thiomorpholino, (lower alkyl) thiomorpholino, di-(lower alkyl) thiomorpholino, (lower alkoxy) thiomorpholino, piperazinyl, (lower alkyl) piperazino, di-(lower alkyl) piperazino, (lower alkoxy) piperazinyl, phenylpiperazinyl, chlorophenylpiperazinyl, tolylpiperazinyl (methoxyphenyl), hydroxyalkylpiperazinpiperazinyl, lower alkanoyloxy-lower alkylpiperazinyl and carbamoyloxy-lower alkyl piperazinyl, and azabicycloalkyl such as 3-azaspiro [5.5] undecanyl and 3-azabicyclo [3.2.2] nonyl. The terms "lower alkyl" and "lower alkoxy" refer to both straight and branched chain radicals of no more than 5 carbon atoms.

Furthermore, there are included primary and secondary amines wherein one of the substituents of the amino moiety corresponds to a radical derived from any of the aforementioned heterocyclic groups, for example, morpholinyl, pyrrolidinyl, thiomorpholinyl, piperazinyl, as well as the unsaturated derivatives thereof, for example, picolyl, tetrazolyl, piperazinyl, and the like.

In another modification of the process, the quaternary salt (Formula C) derived from the starting material Mannich base of Formula A may be converted into the desired end product without the isolation of the intermediate methylene compound of Formula B. In this modification as set forth in Reaction Scheme II, the new organic base, that is to say, the amine, may serve as both the source of alkali and as the reactant.

The novel dimethylaminoalkyloxoisoindoles prepared by this invention are readily synthesized by the process of Reaction Scheme I, starting with an oxoisoindole.

Other aminoalkyloxoisoindoles are most satisfactorily derived from the corresponding dimethylaminoalkyl-oxoisoindole by the general method of Reaction Scheme II, although many products which are tertiary amines may also be prepared by the process of Reaction Scheme I.

The temperatures in the following examples are in degrees centigrade.

EXAMPLE 1

2,4,5-trimethylpyrrol-3-yl N-phenylpiperazinylethyl ketone

A suspension of 16.2 g. (0.1 mole) of 2,4,5-trimethylpyrrol-3-yl vinyl ketone in 30 ml. of ethyl acetate was mixed with 16.2 g. of N-phenylpiperazine. The resulting mixture evolved heat, became clear and then deposited crystals of the product (1.1) 2,4,5-trimethylpyrrol-3-yl N-phenylpiperazinylethyl ketone M.P. 132–133° upon recrystallization from toluene.

In accordance with the above procedure, but treating 2,4,5-trimethylpyrrol-3-yl vinyl ketone with piperidine, morpholine and 4-carbethoxy-4-phenyl piperidine, there are obtained: (1.2) 2,4,5-trimethylpyrrol-3-yl piperidinoethyl ketone hydrochloride, M.P. 184–185°; (1.3) 2,4,5-trimethylpyrrol-3-yl morpholinoethyl ketone, M.P. 103–105°; (1.4) 2,4,5 - trimethylpyrrol-3-yl 4-carbethoxy-4-phenylpiperidinoethyl ketone, M.P. 104–106°.

EXAMPLE 2

4-butyl-2,5-dimethylpyrrol-3-yl pyrrolidinoethyl ketone

Ten g. of 4-butyl-2,5-dimethylpyrrol-3-yl vinyl ketone, 15 ml. of pyrrolidine and 15 ml. of ethanol were heated spontaneously to 50° upon mixing and formed a clear solution. The reaction was brought to completion by brief heating on a steam bath. Evaporation to dryness left a residue which solidified. Recrystallization from cyclohexane gave the product, (2.1) 4-butyl-2,5-dimethylpyrrol-3-yl pyrrolidinoethyl ketone M.P. 96–97°.

In accordance with the above procedure, by treating 4-butyl-2,5-dimethylpyrrol-3-yl vinyl ketone with 2,6-dimethylmorpholine, hexamethyleneimine, thiomorpholine, 4-picolylamine, 3-picolylamine, and 2-propynylamine the following are obtained:

(2.2) 4-butyl-2,5-dimethylpyrrol-3-yl 2,6-dimethylmorpholinoethyl ketone, M.P. 94–95°;
(2.3) 4-butyl-2,5-dimethylpyrrol-3-yl hexamethyleneiminoethyl ketone hydrochloride hemihydrate, M.P. 140–141°;
(2.4) 4-butyl-2,5-dimethylpyrrol-3-yl 2-thiomorpholinoethyl ketone, M.P. 140–142°;
(2.5) 4-butyl-2,5-dimethylpyrrol-3-yl 2-(4-picolylaminoethyl)ketone, M.P. 127–128°;
(2.6) 4-butyl-2,5-dimethylpyrrol-3-yl 2-(3-picolylaminoethyl)ketone dihydrochloride, M.P. 189–191°;
(2.7) 4-butyl-2,5-dimethylpyrrol-3-yl 2-(2-propynylamino) ethyl ketone hydrobromide, M.P. 169°.

In analogous procedures, 4-ethyl-2,5-dimethylpyrrol-3-yl vinyl ketone is reacted with benzylamine, ethylamine, methylamine and ammonia to yield the following products:

(2,8) Benzylaminoethyl 4-ethyl-2-, 5-dimethylpyrrol-3-yl ketone, M.P. 112°;
(2.9) Ethylaminoethyl 4-ethyl-2,5-dimethylpyrrol-3-yl ketone, M.P. 80–84°;
(2.10) 4-ethyl-2,5-dimethylpyrrol-3-yl methylaminoethyl ketone, M.P. 83–84° C.;
(2.11) Aminoethyl 4-ethyl-2,5-dimethylpyrrol-3-yl ketone.

Similarly, 2,5-dimethyl-4-propylpyrrol-3-yl vinyl ketone is reacted with morpholine, N-methylpiperazine and 1,2,3,4-tetrahydroisoquinoline to produce the following:

(2.12) 2,5-dimethyl-4-propylpyrrol-3-yl morpholinoethyl ketone, M.P. 107–108.5°;
(2.13) 4-methylpiperazinylethyl 2,5-dimethyl-4-propylpyrrol-3-yl ketone, M.P. 97–99.5°;
(2.14) 2-(1,2,3,4-tetrahydroisoquinolinylethyl) 2,5-dimethyl-4-propylpyrrol-3-yl ketone, M.P. 115–116°.

EXAMPLE 3

4,5,6,7-tetrahydro-2,3-dimethyl-5-morpholinomethyl-4-oxoindole

Ten g. of 4,5,6,7-tetrahydro-2,3-dimethyl-5-methylene-4-oxoindole, 10 ml. of morpholine and 50 ml. of anhydrous ethanol were heated under reflux for 8 hours. The solution was evaporated to dryness under reduced pressure, the residue taken up in 1 N hydrochloric acid, filtered and the solution made alkaline with aqueous ammonia as in Example 1. The precipitated product was filtered, washed with water, dried and crystallized from toluene, (3.1) 4,5,6,7-tetrahydro-2,3-dimethyl-5-morpholinomethyl-4-oxoindole, M.P. 165–168°.

Refluxing 4,5,6,7 - tetrahydro-2,3-dimethyl-5-methylene-4-oxoindole and propargylamine in ethanol gave (3.2) 4,5,6,7 - tetrahydro - 2,3 - dimethyl-4-oxo-5-propynylaminomethylindole isolated as the hydrochloride, M.P. 220°.

In similar fashion:

4,5,6,7 - tetrahydro-2-methyl-5-methylene 4-oxo-3-phenylindole is heated with morpholine in ethanol to give (3.3) 4,5,6,7-tetrahydro - 2 - methyl-5-morpholinomethyl-4-oxo-3-phenylindole.

2-butyl - 4,5,6,7 - tetrahydro-3-methyl-5-methylene-4-oxoindole, on heating with thimorpholine in ethanol, gave (3.4) 2-butyl - 4,5,6,7 - tetrahydro-3-methyl-4-oxo-5-thimorpholino-methylindole.

EXAMPLE 4

3-ethyl-4,5,6,7-tetrahydro-2-methyl-4-oxo-5-piperidinomethylindole hydrochloride 3-ethyl - 4,5,6,7 - tetrahydro-2-methyl-4-oxoindole 14.1 g. (0.08) mole), 9.8 g. dimethylamine hydrochloride (0.12 mole), and 3.6 g. paraformaldehyde (0.12 mole) were refluxed in 200 ml. ethanol for 40 hours. The solution was evaporated to dryness in vacuo on a steam bath and the residue digested with a mixture of 150 ml. water and 10 ml. 2 N HCl. An insoluble residue of unreacted starting material was filtered off. To the acid solution, ammonia water as above was added dropwise with stirring and the amine crystallized out. It was purified by dissolving in 1 N HCl and addition of aqueous ammonia, then by 3 crystallizations from benzene to yield (4.1) 3-ethyl-4,5,6,7 - tetrahydro - 2 - methyl-4-oxo-5-dimethylaminomethyl, M.P. 170–175°.

Methyl bromide in acetone converted the base into the methobromide salt, M.P. 215–218°. Treatment of the salt with 2 N sodium hydroxide produced 3-ethyl-4,5,6,7-tetrahydro-2-methyl-5-methylene-4-oxoindole, M.P. 217–218°.

When the methylene compound was heated under reflux with piperidine in ethanol for 8 hours a new Mannich base (the 3-ethyl-4,5,6,7-tetrahydro-2-methyl-4-oxo-5-piperidinomethylindole), formed and melted at 165–167°. Its hydrochloride salt melted at 190–192°.

When 3-ethyl-4,5,6,7-tetrahydro - 2 - methyl-5-methylene-4-oxoindole is reacted with the following bases:

methoxyethylamine
ethoxyethylamine
ethylamine
3-morpholinopropylamine
1-hydroxy-2-propylamine
2-hydroxyethylamine
4-picolylamine
3-pyridylamine
N,N-dimethylhydrazine
1-phenyl-2-propylamine
3-piperidylmethylamine
3-dimethylaminopropylamine
N,N-dimethylaminoethylamine
dipropynylamine
dimethallylamine
2-tetrahydropyranylmethylamine
N,N-hexamethylenehydrazine
5-tetrazolylamine
allylamine
methallylamine
propynylamine
cyclopropylamine
2,2-diethoxyethylamine
4-aminomorpholine
N,N-dibutylamine
4-methylpiperidine
4-propylpiperidine
4-benzylpiperidine
4-carboxamidopiperidine
benzylpropynylamine
4-methoxybenzylamine
2,2-diphenylethylamine
9-aminoacridine
hexamethyleneimine
methylphenethylamine
furfurylmethylamine
4-(3-phenylpropyl)piperidine
2-methyl-5-morpholine
benzylmethylamine
butylamine
4-carbethoxy-4-phenylpiperidine
1-adamantanamine
3-azabicyclo[3.2.2]nonane
3-azaspiro[5.5]undecane
methylpropylamine the following are produced.

Some of the compounds are purified as their salts.

(4.2) 3-ethyl-4,5,6,7-tetrahydro-5-(2-methoxyethylaminomethyl)-2-methyl-4-oxoindole, M.P. 108–109°;

(4.3) 5-(2-ethoxyethylaminomethyl)-3-ethyl-4,5,6,7-tetrahydro-2-methyl-4-oxoindole, M.P. 101–102°;

(4.4) 3-ethyl-5-(ethylaminomethyl)-4,5,6,7-tetrahydro-2-methyl-4-oxoindole, M.P. 150–151°;

(4.5) 3-ethyl-4,5,6,7-tetrahydro-2-methyl-5-(3-morpholino-propylaminomethyl)-4-oxoindole dihydrobromide, M.P. 154° (dec.);

(4.6) 3-ethyl-4,5,6,7-tetrahydro-5-(1-hydroxy-2-propyl-aminomethyl)-2-methyl-4-oxoindole, M.P. 172°;

(4.7) 3-ethyl-4,5,6,7-tetrahydro-5-(2-hydroxyethylamino-methyl)-2-methyl-4-oxoindole, M.P. 161–163°;

(4.8) 3-ethyl-4,5,6,7-tetrahydro-2-methyl-4-oxo-5-(4-picolylaminomethyl)indole, M.P. 209–215°;

(4.9) 3-ethyl-4,5,6,7-tetrahydro-2-methyl-4-oxo-5-(3-pyridylaminomethyl)indole, M.P. 185–187°;

(4.10) 3-ethyl-4,5,6,7-tetrahydro-2-methyl-5-(N,N-dimethyl-hydrazinomethyl)-4-oxoindole hydrobromide, M.P. 202–203.5°;

(4.11) 3-ethyl-4,5,6,7-tetrahydro-2-methyl-4-oxo-5-(1-phenyl-2-propylaminomethyl)indole hydrochloride, M.P. 186–189°.

(4.12) 3-ethyl-4,5,6,7-tetrahydro-2-methyl-4-oxo-5-(3-piperidylmethylaminomethyl)indole, M.P. 142–144°.

(4.13) 5-(3-dimethylaminopropylaminomethyl)-3-ethyl-4,5,6,7-tetrahydro-2-methyl-4-oxoindole hydrobromide, M.P. 165–166°.

(4.14 5-(2-dimethylaminoethylaminomethyl)-3-ethyl-4,5,6,7-tetrahydro-2-methyl-4-oxoindole hydrobromide, M.P. 168–169.5°.

(4.15) 3-ethyl-4,5,6,7-tetrahydro-2-methyl-4-oxo-5-dipropynylaminomethylindole, M.P. 143–145°.

(4.16) 3-ethyl-4,5,6,7-tetrahydro-5-dimethallylamino-methyl-2-methyl-4-oxoindole.

(4.17) 3-ethyl-4,5,6,7-tetrahydro-5-(2-tetrahydropyranyl-methyl)aminomethyl-2-methyl-4-oxoindole, M.P. 135–136°.

(4.18) 3-ethyl-5-(N,N-hexamethylenehydrazinomethyl)-4,5,6,7-tetrahydro-2-methyl-4-oxoindole hydrobromide isopropanolate, M.P. 89–90°.

(4.19) 3-ethyl-4,5,6,7-tetrahydro-2-methyl-4-oxo-5-(5-tetrazolylaminomethyl)indole, M.P. 234°.

(4.20) 5-allylaminomethyl-3-ethyl-4,5,6,7-tetrahydro-2-methyl-4-oxoindole, M.P. 130–131.5°.
(4.21) 3-ethyl-4,5,6,7-tetrahydro-5-methallylaminoethyl-2-methyl-4-oxoindole, M.P. 113°.
(4.22) 3-ethyl-4,5,6,7-tetrahydro-2-methyl-4-oxo-5-propynylaminomethylindole hydrochloride, M.P. 204–205.5°.
(4.23) 5-cyclopropylaminomethyl-3-ethyl-4,5,6,7-tetrahydro-2-methyl-4-oxoindole, M.P. 155–156°.
(4.24) 5-(2,2-diethoxyethyl)aminomethyl-3-ethyl-4,5,6,7-tetrahydro-2-methyl-4-oxoindole, M.P. 95–96°.
(4.25) 3-ethyl-4,5,6,7-tetrahydro-2-methyl-5-[(morpholinoamino)methyl]-4-oxoindole, M.P. 157–138.5°.
(4.26) 5-dibutylaminomethyl-3-ethyl-4,5,6,7-tetrahydro-2-methyl-4-oxoindole, M.P. 98–100°.
(4.27) 3-ethyl-4,5,6,7-tetrahydro-2-methyl-5-(4-methylpiperidinomethyl-4-oxoindole, M.P. 167–169°.
(4.28) 3-ethyl-4,5,6,7-tetrahydro-2-methyl-4-oxo-5-(4-propylpiperidinomethyl)indole, M.P. 161–162.5°.
(4.29) 5-(4-benzylpiperidinomethyl)-3-ethyl-4,5,6,7-tetrahydro-2-methyl-4-oxoindole hydrochloride, M.P. 182°.
(4.30) 5-(4-carboxamidopiperidinomethyl)-3-ethyl-4,5,6,7-tetrahydro-2-methyl-4-oxoindole, M.P. 210–212°.
(4.31) 5-(benzylpropynylamino)methyl-3-ethyl-4,5,6,7-tetrahydro-2-methyl-4-oxoindole hydrochloride, M.P. 197–198°.
(4.32) 3-ethyl-4,5,6,7-tetrahydro-5-(4-methoxybenzyl)aminomethyl-2-methyl-4-oxoindole hydrochloride, M.P.123–125°.
(4.33) 3-ethyl-4,5,6,7-tetrahydro-2-methyl-4-oxo-5-(2,2-diphenylethyl)aminomethylindole, M.P. 136–138°.
(4.34) 5-(9-acridinyl)aminomethyl-3-ethyl-4,5,6,7-tetrahydro-2-methyl-4-oxoindole, M.P. 223–226°.
(4.35) 3-ethyl-4,5,6,7-tetrahydro-5-hexamethyleneiminomethyl-2-methyl-4-oxoindole, M.P. 168–169.5°.
(4.36) 3-ethyl-4,5,6,7-tetrahydro-2-methyl-5-methylphenethylamino)methyl-4-oxoindole hydrochloride, M.P. 187–189°.
(4.37) 3-ethyl-5-(furfurylmethylamino)methyl-4,5,6,7-tetrahydro-2-methyl-4-oxoindole, M.P. 103–104°.
(4.38) 3-ethyl-4,5,6,7-tetrahydro-2-methyl-4-oxo-5[4-(3-phenylpropyl) piperidino]methylindole hydrochloride, M.P. 174–176°.
(4.39 3-ethyl-4,5,6,7-tetrahydro-2-methyl-5-morpholinomethyl-4-oxoindole hydrochloride, M.P. 192.5–193°.
(4.40) 5-(benzylmethylamino)methyl)-3-ethyl-4,5,6,7-tetrahydro-2-methyl-4-oxoindole, M.P. 130–132°.
(4.41) 5-butylaminomethyl-3-ethyl-4,5,6,7-tetrahydro-2-methyl-4-oxoindole, M.P. 131°.
(4.42) 5-(4-carbethoxy-4-phenylpiperidino)methyl-3-ethyl-4,5,6,7-tetrahydro-2-methyl-4-oxoindole, M.P. 188–189.5°.
(4.53) 5-(11-adamantanaminomethyl)-3-ethyl-4,5,6,7-tetrahydro-2-methyl-4-oxoindole, M.P. 171°.
(4.44) [(3-azabicyclo[3,2,2]non-3-yl)methyl]-3-ethyl-4,5,6,7-tetrahydro-2-methyl-3-oxoindole.
(4.45) 5-[(3-azaspiro[5.5]undec-3-yl)methyl-3-ethyl-4,5,6,7-tetrahydro-2-methyl-4-oxoindole.
(4.46) 3-ethyl-4,5,6,7-tetrahydro-2-methyl-5-(methyl propylnylamino)methyl-4-oxoindole, M.P. 130–130.5°.

EXAMPLE 5

4,5,6,7-tetrahydro-2-methyl-4-oxo-5-(4-phenylpiperazinylmethyl)-3-propylindole 5-dimethylaminomethyl-4,5,6,7-tetrahydro - 2 - methyl-4-oxo-3-propylindole was prepared from 4,5,6,7-tetrahydro-2-methyl-4-oxo-3-propylindole, dimethylamine hydrochloride and paraformaldehyde, followed by treatment with base as described in preparation 3.1. It was transformed into the methobromide, M.P. 221–222°. Treatment with 2 N sodium hydroxide gave the methylene compound. M.P. 179–181°, which, in turn, reacted with N-phenylpiperazine to produce the final product (5.1) 4,5,6,7-tetrahydro-2-methyl-4-oxo - 5 - (4-phenylpiperazinylmethyl)-3-propylidinole, M.P. 169–171°.

In accordane with the above procedure, but using propynylamine in place of N-phenylpiperazine, there is obtained: (5.2) 4,5,6,7-tetrahydro-2-methyl-4-oxo-3-propyl-5-propynylaminoethylindole hydrochloride·¼ H₂O, M.P. 175–179°.

EXAMPLE 6

4,5,6,7-tetrahydro-1,3-dimethyl-5-dimethylaminomethyl-4-oxoisoindole 2.5-dimethylpyrrole was subjected to the action of succinic anhydride and boron trifluoride etherate in benzene solution to produce 4-(2,5 - dimethyl-3-pyrrolyl)-4-oxobutyric acid, M.P. 154–156° which was, in turn, reduced with hydrazine and alcoholic potassium hydroxide at 190° to 2,5-dimethylpyrrole-3-butyric acid. The reduced acid was not purified, but was cyclized directly with polyphosphoric acid to produce 4,5,6,7-tetrahydro-1,3-dimethyl-4-oxoisoindole, M.P. 150.5–151.5°. The latter was allowed to react with dimethylamine hydrochloride and paraformaldehyde in refluxing ethanol to yield (6.1) 4,5,6,7-tetrahydro-1,3-dimethyl - 5 - dimethylaminomethyl-4-oxoisoindole hydrochloride, M.P. 188–189.5.

In accordance with the above procedure but using 2-methyl-5-p-chlorophenyl pyrrole, 2-methyl-5-p-tolyl pyrrole, 2-methyl-5-p-methoxyphenyl pyrrole and 2-methyl-5-phenyl pyrrole in place of 2,5-dimethyl pyrrole there are obtained (6.2) 4,5,6,7-tetrahydro-1-methyl-3-p-chlorophenyl-5-dimethylaminomethyl - 4 - oxoisoindole hydrochloride, (6.3) 4,5,6,7-tetrahydro-1-methyl-3-p-tolylphenyl - 5 - dimethylaminomethyl-4-oxoisoindole hydrochloride, (6.4) 4,5,6,7-tetrahydro-1-methyl-3-p-methoxyphenyl-5-dimethylaminomethyl - 4 - oxoisoindole hydrochloride, (6.5) 4,5,6,7-tetrahydro - 1 - methyl-3-phenyl-5-dimethylaminomethyl-4-oxoisoindole hydrochloride, M.P. 225–227°.

EXAMPLE 7

4,5,6,7-tetrahydro-1,3-dimethyl-5-piperidinomethyl-4-oxoisoindole hydrochloride

In accordance with the procedure of Example 6, but using piperidine hydrochloride in place of dimethylamine hydrochloride, there is obtained the corresponding (7.1) 4,5,6,7-tetrahydro-1, 3-dimethyl - 5 - piperidinomethyl-4-oxoisoindole hydrochloride, M.P. 188–189° C.

A sample of the hydrochloride salt was converted to the base with aqueous alkali, upon recrystallization from aqueous methanol, the base had an M.P. of 145–146° C.

EXAMPLE 8

2,4,5,6-tetrahydro-1,3-dimethyl-5-dimethylaminomethyl-4-oxocyclopenta [C] pyrrole hydrochloride A mixture of 30.8 g. of diethyl 2,5-dimethyl-3-pyrrolylmethylmalonate, 19 g. of 85% potassium hydroxide and 17 ml. of water was heated on a steam bath under nitrogen for one hour. The resulting solution was acidified to congo red paper with 6 N hydrochloric acid. The liberated acid was extracted with other, dried over magnesium sulfate and distilled to effect decarboxylation. The 2,5-dimethyl-pyrrole-3-propionic acid boiled at 153–154°/0.7–8 mm.

The acid was mixed with five times its weight of polyphosphoric acid and heated at 135° for one hour. The mixture was then poured into water. The solid was collected and purified by dissolving it in benzene and passing the benzene solution through a short column of alumina. 2,4,5,6-tetrahydro-1,3-dimethyl-4-oxocyclopenta [c] pyrrole crystallized from benzene, M.P. 245–248° (decomposition).

A mixture of 7.0 g. of 2,4,5,6-tetrahydro-1,3-dimethyl-4-oxocyclopenta [c] pyrrole, 5.2 g. of dimethylamine hydrochloride, 1.6 g. of paraformaldehyde and 50 ml. of ethanol was heated under reflux for 5 hours. An additional gram of paraformaldehyde was added and the reaction continued for a further 5 hours. The ethanolic solution was concentrated and cooled. The product crystallized and was purified by recrystallization from ethanol.

EXAMPLE 9

4,5,6,7-tetrahydro-1,3-dimethyl-5-methylene-4-oxoisoindole 4,5,6,7 - tetrahydro - 1,3 - dimethyl - 5-dimethylaminomethyl-4-oxoisoindole hydrochloride was dissolved in water and treated with aqueous sodium hydroxide to produce the base, M.P. 169–170°. The base was dissolved in acetone and converted with methyl bromide into the methobromide salt, M.P. 236–238°. When the latter was dissolved in water and made basic with aqueous sodium hydroxide, the yellow 4,5,6,7-tetrahydro-1,3-dimethyl-5-methylene-4-oxoisoindole was obtained.

EXAMPLE 10

4,5,6,7-tetrahydro-1,3-dimethyl-4-oxo-5-(4-phenylpiperazinylmethyl) isoindole

A mixture of 6.0 g. of 4,5,6,7-tetrahydro-1,3-dimethyl-5-methylene-4-oxoisoindole, 6.0 g. of N-phenylpiperazine and 50 ml. of methanol was heated under reflux for 20 hours. Upon evaporation of the ethanol and dilution with ether, the product crystallized to yield (10.1) 4,5,6,7-tetrahydro - 1,3-dimethyl-4-oxo-5-(4-phenylpiperazinylmethyl) isoindole, M.P. 184–185.5° after recrystallization from methanol.

In similar fashion, 4,5,6,7-tetrahydro-1,3-dimethyl-5-methylene-4-oxoisoindole reacts with morpholine to produce (10.2) 4,5,6,7 - tetrahydro-1,3-dimethyl-5-morpholinomethyl-4-oxoisoindole, M.P. 148–149° (hydrochloride, M.P. 172–174°), and with cyclohexylamine to form (10.3) 5-cyclohexylaminomethyl-4,5,6,7-tetrahydro-1, 3-dimethyl-4-oxoisoindole, M.P. 127–128°, and with butylamine to form (10.4) 5-butylamino methyl-4,5,6,7-tetrahydro-1,3-dimethyl-4-oxoisoindole.

EXAMPLE 11

4,5,6,7-tetrahydro-1,2,3-trimethyl-5-dimethyl-aminomethyl-4-oxoisonidole hydrochloride 1,2,5-trimethylpyrrole was subjected to the action of succinic anhydride and boron trifluoride etherate in benzene solution to produce 4-(1,2,5-trimethyl-3-pyrryl) 4-oxobutyric acid M.P. 162.5–163.5°, which was in turn reduced with hydrazine hydrate and potassium hydroxide at 190° to 1,2,5-trimethylpyrrole-3-butyric acid. The reduced acid was not purified, but was cyclized directly with polyphosphoric acid to produce 4,5,6,7-tetrahydro-1,2,3-trimethyl-4-oxoisoindole, M.P. 82–83°. The latter was allowed to react with dimethylamine hydrochloride and paraformaldehyde in refluxing ethanol to yield (11.1) 4,5,6,7 - tetrahydro - 1,2,3 - trimethyl-5-dimethylamonomethyl-4-oxoisoindole hydrochloride, M.P. 195–196°.

In accordance with the above procedure but starting with 1-benzyl-2,5-dimethylpyrrole in place of 1,2,5-trimethyl pyrrole there is obtained 2-benzyl-4,5,6,7-tetrahydro-1,3-dimethyl-5-dimethylaminomethyl - 4 - oxoisoindole hydrochloride.

EXAMPLE 12

4,5,6,7-tetrahydro-1,2,3-trimethyl-5-methylene-4-oxoisoinodle 4,5,6,7 - tetrahydro - 1,2,3 - trimethyl-5-dimethylaminomethyl-oxoisoindole hydrochloride was dissolved in water and treated with aqueous sodium hydroxide to produce the oily free base. The base was dissolved in acetone and converted into the methobromide salt, M.P. 197–200°, with methyl bromide. The methobromide salt, on treatment with aqueous sodium hydroxide, afforded the yellow 4,5,6,7 - tetrahydro - 1,2,3 - trimethyl-5-methylene-4-oxoisoindole, M.P. 103–104°.

EXAMPLE 13

4,5,6,7-tetrahydro-1,2,3-trimethyl-5-morpholinomethyl-4-oxoisoindole hydrochloride A mixture of 5.5 g. of 4,5,6,7-tetrahydro-1,2,3-trimethyl-5-methylene-4-oxoisoindole and 25 ml. of morpholine was heated under reflux for 24 hours. Excess morpholine was removed and the residue, upon dilution with water, solidified. The solid was collected and melted at 97–98.5° upon recrystallization from cyclohexane-benzene. The product was converted into its hydrochloric salt, (13.1) 4,5,6,7 - tetrahydro - 1,2,3-trimethyl-5-morpholinomehyl-4-oxoisoindole hydrochloride, M.P. 213–214°.

EXAMPLE 14

2,4,5,6,7,8-hexahydro-1,3-dimethyl-5-dimethylaminomethyl-4-oxocyclo-hepta [C] pyrrole hydrochloride To a Grignard solution prepared from 13.5 g. of magnesium, 60.5 g. of ethyl bromide and 150 ml. of ether was added 47.6 g. of 2,5-dimethylpyrrole in 140 ml. of ether. After 15 minutes, a solution of 63.0 g. of glutaric anhydride in 560 ml. of tetrahydrofuran was added. The resulting mixture was heated under reflux with stirring for 20 minutes. Addition of 25% aqueous ammonium chloride terminated the reaction. The ether-tetrahydrofuran layer was evaporated to dryness. The residue was shaken with aqueous sodium hydroxide and washed with ether. The alkaline layer was acidified and 2,5-dimethyl-δ-oxopyrrole-3-valeric acid. M.P. 149–150°, was collected. The acid was treated with hydrazine and potassium hydroxide at 190° to yield 2,5-dimethylpyrrole-3-valeric acid which was cyclized directly with polyphosphoric acid to give 2,4,5,6,7,8 - hexahydro - 1,3-dimethyl-4-oxocyclohepta-[c] pyrrole.

Reaction with dimethylamine hydrochloride and paraformaldehyde in refluxing ethanol yields (14.1) 2,4,5,6, 7,8 - hexadyro - 1,3 - dimethyl-5-dimethylaminomethyl-4-oxo-cyclohepta [c] pyrrole hydrochloride.

EXAMPLE 15

2,4,5,6-tetrahydro-1,3-dimethyl-5-morpholinomethyl-4-oxocyclopenta [C] pyrrole hydrochloride A 10 g. portion of 2,4,5,6-tetrahydro-1,3-dimethyl-5-methylene-4-oxocyclopenta [c] pyrrole, 10 ml. of morpholine and 50 ml. of ethanol were heated under reflux for 24 hours. Evaporation of the solvent and dilution with water yielded the product (15.1)2,4,5,6-tetrahydro-1,3-dimethyl - 5 - morpholinomethyl - 4-oxocyclopenta [c] pyrrole. It was converted into the crystalline hydrochloride salt.

EXAMPLE 16

2,4,5-trimethylpyrrol-3-yl-N-phenylpiperazinyl-ethyl ketone

Dimethylaminoethyl 2,4,5 - trimethylpyrrol-3-yl ketone methiodide (17.5) g., 0.05 mole), M.P. 206–207°, and 8.1 g. of N-phenylpiperazine (0.05 mole) were heated under reflux in 400 ml. of anhydrous ethanol. The methiodide dissolved and trimethylamine gas evolved. After one hour, the solution was poured into a mixture of 300 g. of ice and 50 ml. of aqueous ammonia. The product (16.1)2,4,5 - trimethylpyrrol - 3-yl N - phenylpiperazinylethyl ketone separated and solidified. Upon recrystallization from toluene, it melted at 132–133° and was identical with the product of Example 1.

EXAMPLE 17

4,5,6,7-tetrahydro-2,3-dimethyl-4-oxo-5-(4-phenylpiperazinylmethyl)indole

A mixture of 6.9 g. of 4,5,6,7-tetrahydro-2,3-dimethyl-4-oxo-5-piperidinomethylindole methiodide (prepared as described in Preparation III), 2.85 g. of N-phenylpiperazine and 300 ml. of ethanol was heated under reflux until a clear solution was obtained. Upon concentration to 40 ml. and standing in the refrigerator, the product (17.1) 4,5,6,7-tetrahydro-2,3-dimethyl - 4 - oxo - 5 - (4-phenylpiperazinylmethyl)indole crystallized, M.P. 215–216° upon recrystallization from ethanol.

EXAMPLE 18

3-ethyl-4,5,6,7-tetrahydro-5-(4-hydroxy-4-phenylpiperidino)methyl-2-methyl-4-oxoindole 5-dimethylaminomethyl-3-ethyl - 4,5,6,7 - tetrahydro-2-methyl-4-oxoindole methobromide 16.45 g. (0.05 mole) and 8.9 g. 4-hydroxy-4-phenylpiperidine (0.05 mole) were refluxed in 150 ml. ethanol on a steam bath for 2 hours. The methobromide went into solution within 10 minutes and trimethylamine was liberated. The solution was concentrated to 50 ml. and poured into an excess ammonia water. A solid amine precipitated which was filtered, washed with water, dried, and crystallized twice from dioxane, then twice from benzene; (18.1)3-ethyl-4,5,6,7-tetrahydro - 5 - (4-hydroxy - 4 - phenylpiperidino)methyl-2-methyl-4-oxoindole, M.P. 185–186°.

EXAMPLE 19

1,2,3,4,5,6,7,8-octahydro-4-oxo-3-piperidinomethylcarbazole 1,2,3,4,5,6,7,8-octahydro - 3 - dimethylaminomethyl-4-oxocabrazole, M.P. 172–173.5°, was prepared from 1,2,3,4,5,6,7,8-octahydro-4-oxocarbazole, dimethylamine hydrochloride and paraformaldehyde by the method of Preparation III. The base was dissolved in acetone and treated with methyl bromide gas. The methobromide salt soon crystallized from solution, and upon drying, melted at 217–219° (decomposition). The methobromide was dissolved in 30% aqueous methanol and 1 N sodium hydroxide solution was added. Pale yellow 1,2,3,4,5,6,7,8-octahydro-3-methylene-4-oxocarbazole separated and, upon crystallization from ethanol, melted at 219–220°. The final product (19.1) 1,2,3,4,5,6,7,8 - octahydro-4-oxo-3-piperidinomethylcarbazole was obtained by heating the methylene compound under reflux with piperidine in ethanol for 8 hours.

The active compounds synthesized by the process of this invention may be taken in tablets or capsules in doses of 1–100 mg., in syrup at 0.5–20 mg./ml. concentration, in 1–50 mg. suppositories or by parenteral injection in 0.5–50 mg./ml. concentration. The following examples are illustrative.

EXAMPLE 20

Ingredients: Mg./tablet
4,5,6,7-tetrahydro - 1,3 - dimethyl - 5 - dimethylaminoethyl-4-oxoisoindole hydrochloride ___ 10
Lactose USP (spray dried) _____ 170
Starch USP _____ 10
Magnesium stearate USP _____ 1
Flavor _____ q.s.

All above ingredients were passed through a 60-mesh sieve, blended for 30 minutes and compressed directly into tablets on a suitable tablet press at a weight of 191 mg., using a 11/32″ biconcave scored punch.

EXAMPLE 21

Ingredients: Mg./suppository
4,5,6,7-tetrahydro - 1,3-dimethyl-5-morpholinomethyl-4-oxoisoindole hydrochloride (mg.) __ 100
Cocoa butter _____ q.s.

The drug and cocoa butter are combined, mixed thoroughly and formed into 2 gram suppositories.

EXAMPLE 22

Ingredients: Mg./capsule
4,5,6,7-tetrahydro - 1,3-dimethyl-4-oxo-5-piperidinomethylisoindole hydrochloride _____ 20
Lactose USP _____ 100
Magnesium Stearate _____ 1
Amorphous silicon dioxide (Cab-O-Sil) _____ 5

These ingredients were combined, blended and passed through a No. 1 screen of Fitzpatrick comminutor machine before encapsulating into a two-piece hard gelatin No. 3 capsule on a standard capsulating machine at a net weight of 126 mg.

EXAMPLE 23

Ingredients: Mg./ml.
4,5,6,7-tetrahydro - 1,2,3 - trimethyl-5-dimethylaminomethyl-4-oxoisoindole hydrochloride __ 5
Sodium chloride _____ qs. for isotonicity
Methylparaben USP (mg.) _____ 1.8
Propylparaben USP (mg.) _____ 0.2
Water _____ q.s.

The above ingredients are combined in sterile solution for parenteral use.

EXAMPLE 24

Ingredients: Grams/liter
4,5,6,7-tetrahydro-1-methyl - 5-dimethylaminomethyl-4-oxo - 3 - phenylisoindole hydrochloride _____ 10
Granulated sugar _____ 600
Flavor _____ q.s.
Color _____ q.s.
Sodium benzoate _____ 1
Deionized water _____ q.s.

All above ingredients are dissolved in water, combined and made up to a volume of one liter.

PREPARATION OF STARTING MATERIALS

Preparation I

The 2,4,5 - trimethylpyrrol - 3 - yl vinyl ketone is prepared as follows: 15.1 g. of methyl 2,4,5-trimethylpyrrol-3-yl ketone (0.10 mole), 12.3 g. dimethylamine hydrochloride (0.15 mole), and 4.5 g. paraformaldehyde (0.15 mole) in 250 ml. anhydrous ethanol was heated under reflux. After 24 hours, another 1.5 g. paraformaldehyde was added. After refluxing for a total of 48 hours, the solution was evaporated to dryness in vacuo on a steam bath and the solid residue crystallized from ethanol with addition of charcoal. After 2 recrystallizations from ethanol the dimethylaminoethyl 2,4,5 - trimethylpyrrol-3-yl ketone hydrochloride thus obtained melted at 197–198.5°. Upon treatment of the hydrochloride with aqueous ammonia (concentration: 10%), the base was liberated. It was taken up in acetone and treated with methyl bromide. The quaternary salt separated rapidly and melted at 188–190° upon recrystallization from methanol.

The methobromide was dissolved in water and treated with an excess of 2 N sodium hydroxide. The yellow vinyl compound separated and crystallized. It melted at 147–148.5° upon recrystallization from ethanol.

Preparation II

The 4 - butyl - 2,5 - dimethylpyrrol - 3 - yl vinyl ketone is prepared as follows: 2-oximino-3-heptanone and 2,4-pentanedione were condensed in a Knorr synthesis to produce 4-butyl - 2,5 - dimethylpyrrol-3-yl methyl ketone, M.P. 124–125°. The ketone (0.1 mole), dimethylamine hydrochloride (0.15 mole) and paraformaldehyde (0.15 mole) were heated under reflux in 250 ml. of ethanol for 24 hours. Another 1.5 g. of paraformaldehyde was added and reflux was continued for a total of 48 hours. Evaporation yielded 4 - butyl - 2,5 - dimethylpyrrol-3-yl 2-dimethylaminoethyl ketone hydrochloride, M.P. 157–160°. Aqueous ammonia as in Preparation I liberated the base which was dissolved in acetone and treated with methly bromide to produce 4 - butyl - 2,5 - dimethylpyrrol-3-yl dimethylaminoethyl ketone methobromide, M.P. 166–168.5°. The methobromide was dissolved in water and treated with aqueous sodium hydroxide as in Preparation I to precipitate the vinyl ketone, M.P. 106° after recrystallization from isopropanol.

In accordance with the above procedure, but starting with 2-oximino 3-hexanone and 2-oximino 3-pentanone, respectively, there are obtained 4 - propyl - 2,5 - dimethylpyrrol-3-yl vinyl ketone M.P. 106–107.5° and 4-ethyl-2,5-dimethylpyrrole-3-yl vinyl ketone M.P. 148–149°, respectively.

Preparation III

The 4,5,6,7 - tetrahydro - 2,3 - dimethyl - 5 - methylene-4-oxoindole was prepared by two routes:

*Route 1.*—4,5,6,7 - tetrahydro - 2,3 - dimethyl-4-oxoindole (163 g., 1 mole), 81.5 g. of dimethylamine hydrochloride (1.0 mole), and 45 g. of paraformaldehyde (1.5 mole) were heated under reflux in 2500 ml. of ethanol. After 8 hours, 10 g. of paraformaldehyde was added, and after 24 hours, another 10 g. After 48 hours under reflux, 1200 ml. of ethanol was distilled and the resulting mixture was cooled. 4,5,6,7 - tetrahydro - 2,3 - dimethyl-5 - dimethylaminomethyl-4-oxoindole hydrochloride crystallized and was collected: M.P. after crystallization from ethanol, 230°.

The salt was converted into the base with aqueous ammonia as above and 51 g. thereof was dissolved in 350 ml. isopropanol, and methyl bromide gas bubbled through the solution. The temperature of the solution rose to about 45° and within a few minutes the methobromide crystallized. Addition of methyl bromide was continued for 40 minutes until the precipitate did not increase any more. After standing several hours at room temperature, the crystals were filtered off, washed with isopropanol, dried (yield 70 g.) and crystallized from a mixture of anhydrous methanol and ethanol, M.P. 222°.

The methobromide (10 g.) was dissolved in a mixture of 50 ml. of ethanol and 50 ml. of water. Upon addition of 20 ml. of normal aqueous sodium hydroxide, a yellow solid separated. It was filtered, washed with water and recrystallized to give the methylene compound, M.P. 197–198°.

Similarly, but starting with 4,5,6,7 - tetrahydro-2-methyl - 3 - phenyl - 4 - oxoindole and 2-butyl - 3 - methyl-4-oxoindole there are produced the corresponding 4,5,6,7-tetrahydro - 2 - methyl - 3 - phenyl - 5 - dimethylamino-4-oxoindole and 4,5,6,7 - tetrahydro - 2 - butyl-3-methyl-5-dimethylaminomethyl - 4 - oxoindole, M.P. 182–183° and 138.5–139.5°, respectively.

*Route 2.*—4,5,6,7 - tetrahydro - 2,3 - dimethyl-4-oxoindole (16.3 g., 0.10 mole) was heated to reflux with 10.7 g. of paraformaldehyde (0.15 mole) and 14.5 g. of piperidine hydrochloride (0.12 mole) in 250 ml. ethanol. After 8 hours, another 1 g. of paraformaldehyde was added and refluxing continued for a total of 48 hours. The solution was evaporated to dryness in vacuo on a steam bath, the residue taken up in 150 ml. water to which 10 ml. of 2 N hydrochloric acid had been added and the solution freed from an insoluble residue (unchanged starting material) by filtration. The filtrate was made alkaline with ammonia water as above, whereupon a white solid precipitated. This was filtered, washed with water, dried at 80° and crystallized several times from benzene followed by crystallization from benzene-heptane. The 4,5,6,7 - tetrahydro - 2,3 - dimethyl - 4 - oxo - 5 - piperidinomethylindole, M.P. 179°, thus obtained was dissolved in acetone and treated with excess methyl iodine. The methiodide salt, M.P. 219–220° crystallized upon standing overnight. Treatment with alkali as described for Route 1 produced the methylene compound, M.P. 197–198°.

We claim:

1. A process for the preparation of an alkenyl pyrrol-3-yl ketone of the formula:

$$R_3\text{-}\underset{\underset{R_1}{\overset{}{N}}}{\overset{}{\underset{R_2}{\diagdown}}}\text{-}\overset{O}{\overset{\|}{C}}\text{-}\underset{R_5}{\overset{}{C}}\text{=}CH_2$$

wherein
$R_1$ is hydrogen, lower alkyl having from 1 to 6 carbon atoms, phenyl, phenyl-alkyl wherein the alkyl group has from 1 to 3 carbon atoms, substituted phenyl or substituted phenyl-(lower alkyl) in which the substituent on the phenyl ring is halogen, lower alkyl of from 1 to 4 carbon atoms, alkoxy of from 1 to 4 carbon atoms or halogenated alkyl of from 1 to 4 carbon atoms;
$R_2$, $R_3$ and $R_4$ are each hydrogen, alkyl, alkenyl or cycloalkyl having from 1 to 8 carbon atoms, phenyl, halophenyl, (lower alkoxy)phenyl, or benzyl; and
$R_5$ is hydrogen, lower alkyl, alkenyl or cycloalkyl having a maximum of 8 carbon atoms, phenyl or benzyl; or
$R_2$ and $R_5$ are linked to form a saturated carbocyclic ring containing 6 or 7 carbon atoms; or
$R_3$ and $R_5$ may together constitute a methylene radical or be linked to form a saturated carbocyclic ring containing 6 or 7 carbon atoms;

which comprises reacting a quaternary salt of the formula:

$$R_3\text{-}\underset{\underset{R_1}{\overset{}{N}}}{\overset{}{\underset{R_2}{\diagdown}}}\text{-}\overset{O}{\overset{\|}{C}}\text{-}\underset{R_5}{\overset{}{C}H}\text{-}CH_2\text{-}\underset{R_9}{\overset{R_8}{\overset{|}{N^+}}}\text{-}R_7Z^-$$

wherein
$R_1$ through $R_5$ have the same meaning as above,
$R_7$, $R_8$ and $R_9$ are lower alkyl of from 1 to 4 carbon atoms; or
$R_7$ and $R_9$ may be linked to form a piperidino, pyrrolidinyl or hexamethylenimino moiety; and
$Z^-$ designates an anion selected from halide or sulfate;

with an alkali metal hydroxide, ammonia or triethyl amine in an aqueous medium.

2. The process of claim 1, for the preparation of an alkenyl oxopyrrole wherein
$R_2$ and $R_3$ are each hydrogen, alkyl, alkenyl or cycloalkyl having from 1 to 8 carbon atoms, phenyl, halophenyl, (lower alkoxy)phenyl, or benzyl; and
$R_5$ is hydrogen, alkyl alkenyl or cycloalkyl having from 1 to 8 carbon atoms, phenyl, or benzyl.

3. The process of claim 1 for the preparation of an alkenyl oxindole of the formula:

$$R_3\text{-}\underset{\underset{R_1}{\overset{}{N}}}{\overset{}{\underset{(CH_2)_n}{\diagdown}}}\overset{O}{\overset{\|}{\diagup}}\text{=}CH_2$$

wherein $n$ is 1 or 2 and the several substituents are as defined in said claim.

4. The process of claim 1 for the preparation of an alkenyl oxoisoindole of the formula:

$$R_2\text{-}\underset{\underset{R_4}{\overset{}{}}}{\overset{}{\underset{(CH_2)_n}{\diagdown}}}\overset{O}{\overset{\|}{\diagup}}\text{=}CH_2$$

wherein $n$ is an integer from 0 to 2 and the several substituents are as defined in said claim.

5. An alkenyl pyrrol-3-yl ketone of the formula:

$$R_3\text{-}\underset{\underset{R_1}{\overset{}{N}}}{\overset{}{\underset{R_2}{\diagdown}}}\text{-}\overset{O}{\overset{\|}{C}}\text{-}\underset{R_5}{\overset{}{C}}\text{=}CH_2$$

wherein
R₁ is hydrogen, lower alkyl having from 1 to 6 carbon atoms, phenyl, phenyl-alkyl wherein the alkyl group has from 1 to 3 carbon atoms, substituted phenyl or substituted phenyl-(lower alkyl) in which the substituent on the phenyl ring is halogen, lower alkyl of from 1 to 4 carbon atoms, alkoxy of from 1 to 4 carbon atoms or halogenated alkyl of from 1 to 4 carbon atoms;

R₂, R₃ and R₄ are each hydrogen, alkyl, alkenyl or cycloalkyl having from 1 to 8 carbon atoms, phenyl, halophenyl, (lower alkoxyphenyl, or benzyl; and R₅ is hydrogen, alkyl, alkenyl or cycloalkyl having a maximum of 8 carbon atoms, phenyl or benzyl; or R₂ and R₅ are linked to form a saturated carbocyclic ring containing 6 or 7 carbon atoms; or R₃ and R₅ may together constitute a methylene radical or be linked to form a saturated carbocyclic ring containing 6 or 7 carbon atoms.

6. An alkenyl pyrrol-3-yl ketone within the scope of claim 5, wherein
R₂ and R₃ are each hydrogen, alkyl, alkenyl or cycloalkyl having from 1 to 8 carbon atoms, halophenyl, (lower alkoxy)phenyl, or benzyl; and
R₅ is hydrogen, alkyl, alkenyl or cycloalkyl having from 1 to 8 carbon atoms, phenyl, or benzyl.

7. An alkenyl pyrrol-3-yl ketone according to claim 6, having the designation 4-butyl-2,5-dimethylpyrrol-3-yl vinyl ketone.

8. An alkenyl pyrrol-3-yl ketone within the scope of claim 5, of the formula:

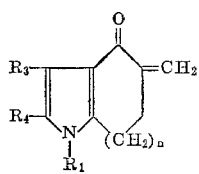

wherein n is 1 or 2 and the several substituents are as defined in said claim.

9. An alkenyl pyrrol-3-yl ketone according to claim 8, having the designation 3-ethyl-4,5,6,7-tetrahydro-2-methyl-5-methylene-4-oxoindole.

10. An alkenyl pyrrol-3-yl ketone within the scope of claim 5, of the formula:

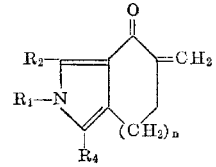

wherein n is an integer from 0 to 2 and the several substituents are as defined in said claim.

11. An alkenyl pyrrol-3-yl ketone according to claim 10, having the designation 4,5,6,7 - tetrahydro - 1,3 - dimethyl-5-methylene-4-oxoisoindole.

12. The process of claim 1, for the preparation of 4-butyl-2,5-dimethylpyrrol-3-yl vinyl ketone.

13. The process of claim 1, for the preparation of 3-ethyl - 4,5,6,7 - tetrahydro - 2 - methyl-5-methylene-4-oxoindole.

14. The process of claim 1, for the preparation of 4,5,6,7 - tetrahydro - 1,3 - dimethyl-5-methylene-4-oxoisoindole.

References Cited
UNITED STATES PATENTS 3,491,093    1/1970    Pachter et al. _____ 260—247.5

ALEX MAZEL, Primary Examiner

J. A. NARCAVAGE, Assistant Examiner

U.S. Cl. X.R.

260—243 B, 247.5 R, 250 A, 256.4 R, 268 MK, 288 R, 296 R, 294.7 G, 307 R, 308 D, 310 R, 326.5 SM, 326.5 D, 999